March 9, 1943.  G. H. REID  2,313,480
APPARATUS FOR TRAINING PILOTS, NAVIGATORS AND LIKE AIRCRAFT PERSONNEL
Filed July 12, 1941  3 Sheets-Sheet 1

Inventor:
G. H. Reid.
By: Stevens and Davis
Attys.

March 9, 1943.    G. H. REID    2,313,480
APPARATUS FOR TRAINING PILOTS, NAVIGATORS AND LIKE AIRCRAFT PERSONNEL
Filed July 12, 1941    3 Sheets-Sheet 2
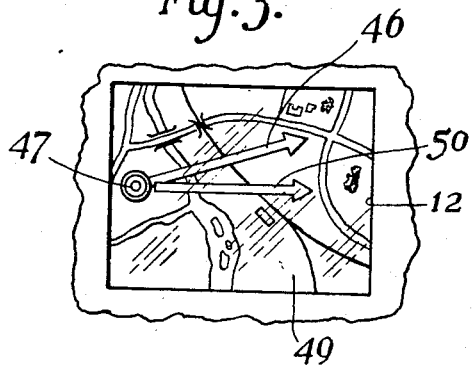
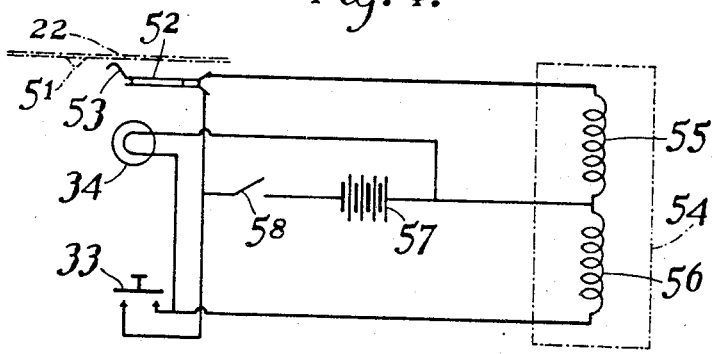
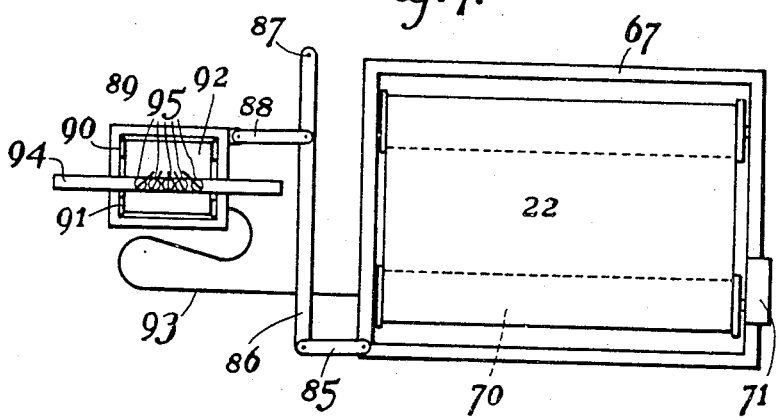
Inventor:
G. H. Reid.
By Stevens and Davis
Attys.

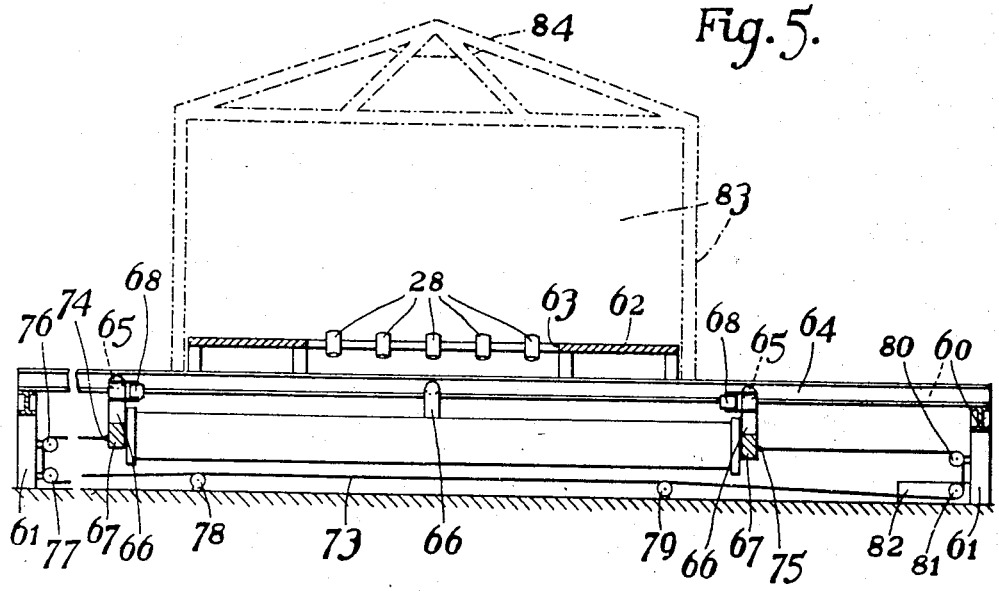
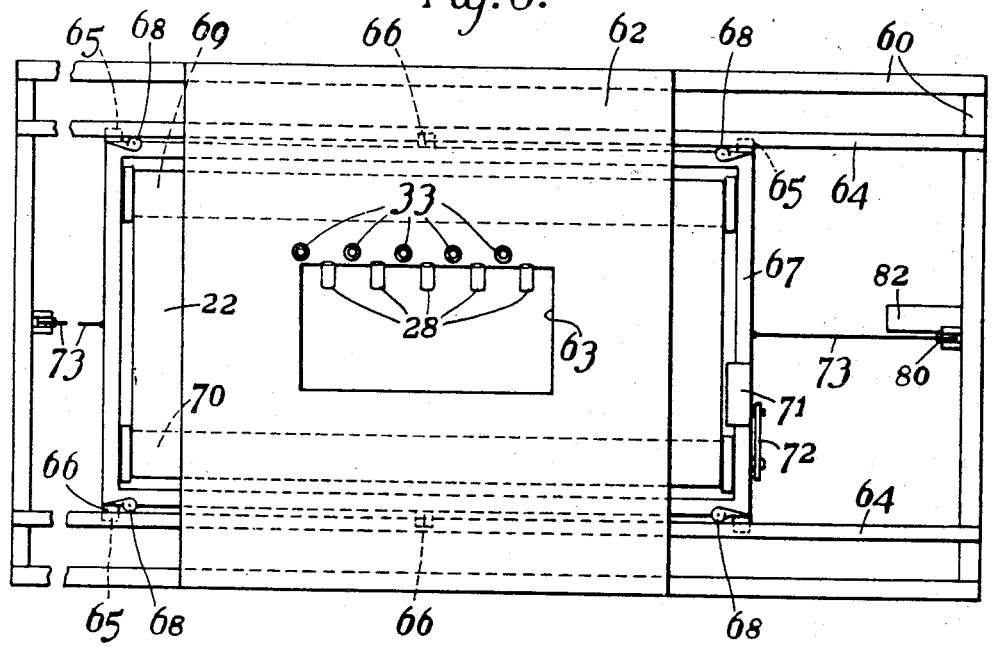

Patented Mar. 9, 1943

2,313,480

UNITED STATES PATENT OFFICE 2,313,480

APPARATUS FOR TRAINING PILOTS, NAVIGATORS, AND LIKE AIRCRAFT PERSONNEL

George Hancock Reid, London, England

Application July 12, 1941, Serial No. 402,218
In Great Britain March 16, 1940

7 Claims. (Cl. 35—12)

This invention relates to training apparatus for pilots, navigators and like aircraft personnel.

It is the main object of the invention to provide an improved form of apparatus which is specially arranged to simulate conditions that occur during flying and which is particularly intended to produce rapid proficiency in the art of bombing. It is a further object of the invention to provide an apparatus which is capable of being used by a number of pupils simultaneously, and which from the instructor's point of view is exceptionally convenient.

According to the invention, there is provided a device for ground training or practice in aerial bombing, comprising an elongated map arranged to move at a predetermined rate across an observation opening, a bombing sight directed through said opening and on to the map, a dummy bomb release button or equivalent, and an indicating device which is actuated by the release button or equivalent and indicates the theoretical bomb landing position.

Further, the improved device may comprise a map which is caused to move past an observation opening at a predetermined rate, a bombing sight arranged to be directed through the opening on to the map, a dummy manually operable bomb release and an electrical indicating device which is actuated by the bomb release and provides an indication of the theoretical bomb-landing position.

According to another aspect of the invention, a device for ground training or practice in aerial bombing, navigation and the like, comprises a map which is arranged with means whereby it is moved longitudinally at a predetermined speed past an observation opening, said means being adapted to move the map simultaneously in a lateral direction, a bombing sight directed on to the map, a dummy manually operable bomb release, and means to give an indication of the theoretical bomb-landing position.

If desired, a time lag device may be operatively interposed between the release button or equivalent and the landing position indicator to take account of the time of flight of a bomb. The bombing sight may be mounted to be angularly adjustable to compensate for variations in the line of sight corresponding to different altitudes of a bombing aircraft, and in this case the time lag switch may be operatively connected with the bombing sight so as to be adjusted automatically as the inclination of the bombing sight is changed.

The indicating means may conveniently comprise an electric lamp disposed below the map, through which its light shines to show the landing point of the bomb. In addition, or alternatively, the arrangement may be such that the dummy bomb release and the map both operate a chronograph to produce a comparative record of the instant when the bombing release is actuated, and the instant when it should have been actuated to cause an imaginary bomb to strike a predetermined position on the map. The map may be arranged to actuate an electric switch as a predetermined point on said map reaches a predetermined position. An angularly movable index can be provided in conjunction with the map to indicate the longitudinal axis of the aircraft.

In one general arrangement, the map comprises a strip of flexible material, one end of which is fastened to a winding roller while the other end is secured to a spring loaded return roller. Alternatively, the map comprises an endless band passing around a pair of rollers, one of which is driven, said map and a plurality of mutually parallel rollers by which it is carried being mounted, if desired, in a frame which is arranged to move rectilinearly in a direction substantially parallel with the axes of the rollers. The frame may be supported on runners and may be caused to move along said runners by a tension member which is in the form of a loop having both its ends secured to the frame, said tension member being operatively connected with driving means which cause it to bring about lateral movement of the map.

If desired, an auxiliary map device may be provided which operates in unison with the main map, and which has "shot" indicating means for the use of an instructor, said auxiliary map device conveniently being of smaller scale than the main map and being driven from the map by speed reducing means.

The invention is illustrated by way of example in the accompanying diagrammatic drawings, in which:

Figure 3 is a fragmentary plan of an angularly movable index device;

Figure 4 is an electrical wiring diagram of one convenient form of indicating system;

Figure 5 is a sectional elevation of a larger form of training device adapted to be used simultaneously by several pupils;

Figure 6 is a plan corresponding to Figure 5, and;

Figure 7 is a diagrammatic representation showing one method of operating an auxiliary map in conjunction with the device shown in Figures 5 and 6.

Figure 1:
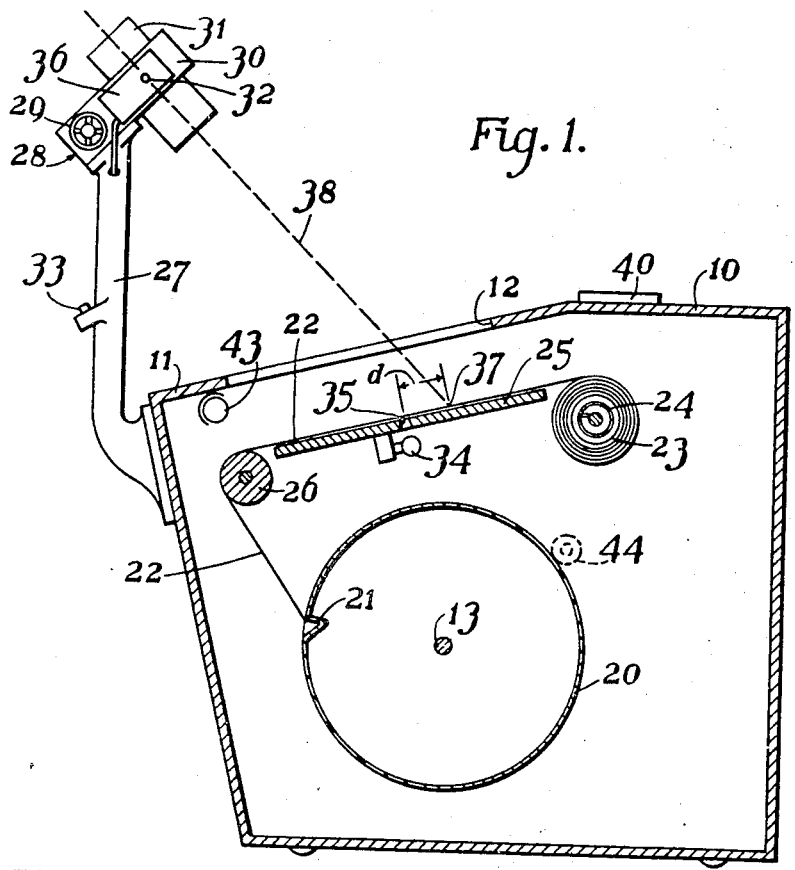
Figure 1 is a side elevation of a bombing training device arranged to be used by a single pupil at a time, the device being shown partly in section.
Figure 2:
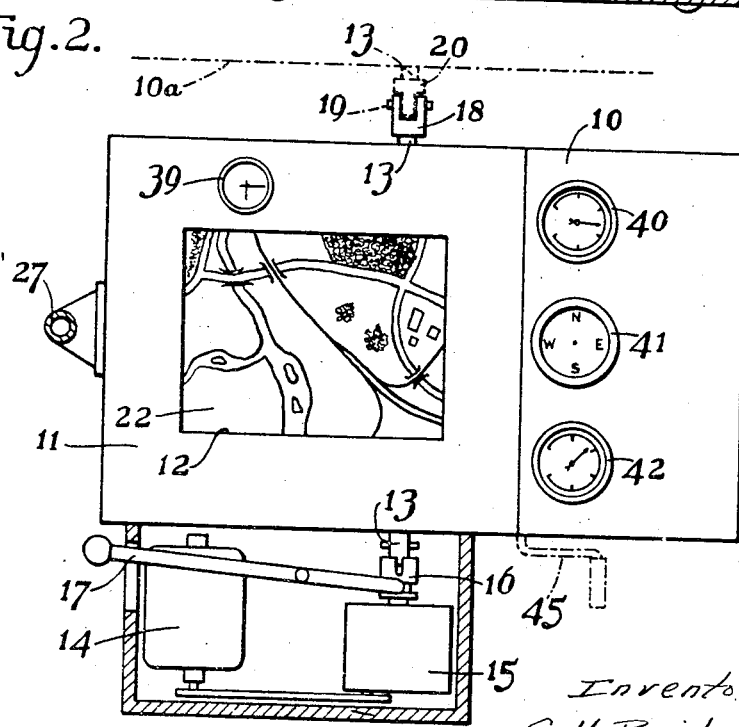
Figure 2 is a plan corresponding to Figure 1, the bombing sight being omitted.

The device shown in Figures 1 and 2 comprises a casing 10 which is in the nature of a desk and has the front part 11 of its upper wall arranged to slope downwardly, said part being formed with a rectangular opening 12 which may be glazed if desired. A spindle 13 extends across the casing 10 and is arranged to rotate at a predetermined slow speed by means of an electric motor 14 driving a reduction gear box 15, as will be seen in Figure 2. A readily engageable and disengageable clutch device 16 operated by a lever 17 enables the spindle 13 to be stopped, when desired, independently of the motor 14. At its opposite end the spindle 13 is provided with a forked fitting 18 adapted to be connected by a pin 19 with a mating fitting 20 upon the spindle 13 of an adjacent training device indicated at 10a. The training device 10a the spindle 13 of which may in turn drive other training devices, would not, of course, be provided with an electric motor and gear box, for with this arrangement a single motor 14 can be utilised to drive simultaneously several training devices disposed in a row.

Within the casing 10, a drum 20 of relatively large diameter is fitted upon the spindle 13, and is arranged at 21 for the attachment of the lower end of a map 22 which is composed of flexible material and is in the form of a strip. The other end of the map is secured to a roller 23, which is freely rotatable but is normally urged in a clockwise direction by a coiled spring 24 acting in the manner of a roller blind spring. The map 22 passes across the upper surface of an inclined table 25 and then around a freely rotatable guide roller 26, from whence it passes to the drum 20. It will thus be seen that when the clutch 16 is disengaged, the roller 23 unwinds the map 22 as far as possible from the drum 20 in readiness for a test. Upon engaging the coupling device 16 with the motor 14 running, the drum 20 is rotated slowly at a predetermined rate and the map 22 is drawn steadily along the table 25 so as to be readily visible through the window opening 12. It will be apparent that the speed of travel can be readily adjusted, if desired, either by the provision of a multi-ratio gear box at 15, or by regulating the speed of the motor 14. The drum 20 is of relatively large diameter so that it is capable of receiving a long length of map without having its effective diameter substantially increased, thus enabling the map to advance for its whole length at a substantially constant rate.

A bracket 27 secured to the front of the casing 10 serves as a support for a bombing sight, which is indicated generally at 28. Movement of a wheel 29 upon the fixed part 30 serves to adjust the angular position of the sight tube 31 about the axis of a spindle 32 carried by the tube 31, this movement serving to compensate in the known manner for the supposed height of the aircraft above the level of the ground. A push button switch 33, simulating the bombing release push button of an aircraft, is provided upon the bracket 27 and is connected in circuit with a lamp 34 disposed below an aperture 35 in the table 25, and also with a time delay switch 36 which is mounted upon the fixed part 30 of the bomb sight 28. The spindle 32, which moves with the sighting tube 31, is mechanically connected with the mechanism of the time delay switch so that the delay is always proportional to the distance d, measured from the aperture 35 to the point 37 at which the line of sight 38 meets the plane of the map 22. The map 22 is preferably composed of translucent or possibly transparent material so that when the lamp 34 lights, it gives an indication of the spot where the bomb would have landed, and thus shows the accuracy of the pupil's aim. The casing 10 is preferably provided with a clock 39 and other instruments, such for examplee, as an air-speed indicator 40, a magnetic compass 41 and an engine revolution indicator 42, these preferably being dummy in form but provided with hands which can be manually set to any desired position so as to provide data for working out problems in navigation and the like.

The upper surface of the map 22 is normally illuminated by an electric lamp 43 which can be shaded or otherwise adapted to give an imitation of various effects, such as sunshine, moonlight and other conditions which are experienced during actual bombing. The drum 20 may be connected frictionally or otherwise with a wheel, pinion, or the like indicated in broken lines at 44 in Figure 1, the member 44 being adapted to be engaged by an emergency handle 45 (see Figure 2), so that the drum 20 can be rotated by hand at a fairly constant speed should conditions make it impossible to operate the device by the motor 14. If desired, for aiding pupils in navigational and like problems, an angularly movable index pointer 46 may be secured pivotally at 47 to a sheet of glass 49 fitted within the window opening 12, as shown in Figure 3. A fixed pointer or index 50, marked upon or secured to the glass, serves to show the direction of movement of the map 22, so that the position of the index or pointer 46 can be regarded as being the longitudinal axis of the aircraft when a side wind is blowing, or when other factors are operating to cause drift.

The improved form of training device can readily be used in conjunction with a chronograph, so as to show the accuracy with which the pupil is operating the bombing release. For this purpose the map 22, indicated by broken lines in Figure 4, is provided at a predetermined point with a projection 51 adapted to close instantaneously an electric switch 52 by engaging with an upstanding finger 53 carried by one of the leaves of said switch. The chronograph is indicated diagrammatically at 54, and has a pair of electro-magnets 55 and 56 adapted to operate pens or other marking devices (not shown) which produce a record upon a constantly moving strip, disc or the like in the well known manner. The pupil's push button switch 33 is connected in series with the electro-magnet 56, a battery 57 and a main control switch 58, while the automatic switch 52 is similarly connected across the battery 57 and main switch 58 through the medium of the electro-magnet 55. A time delay switch has not been included in this circuit, and it is assumed that the line of sight of the bombing sight is directed on to the aperture 35 in Figure 1. The lamp 34 is connected as shown, in parallel with the electro-magnet 56, so that when the switch 58 is closed and the pupil operates the push button switch 33, the lamp 34 is lit and at the same time the chronograph 54 registers the instant of operation. If the aim is perfect, the switch 52 is closed at that same instant by the projection 51, and the fact is recorded by the simultaneous operation of the electro-magnet 55 of the chronograph. Should the press button switch 33 be operated too early or too late, this is, of course, clearly disclosed by the chronograph record.

Figures 5 and 6 show a modified form of training device which is larger than the arrangement in Figures 1 and 2, and is capable of being used by a number of pupils simultaneously. It is further, more adaptable and is applicable to the practical solution of a large variety of navigational and other problems. It comprises a substantially rectangular framework 60 which is conveniently composed of steel girders and is supported on legs 61. This framework 60 carries an elevated floor 62, which is formed at its centre with a relatively large observation opening 63, said floor being fitted with a series of press button switches 33 and corresponding bombing sights 28. The pupils are of course intended to assume a prone position upon the floor 62 so that the device gives a very realistic representation of the actual conditions prevailing in a bombing aircraft.

The framework 60 serves to support a pair of runners 64 which are conveniently of channel cross-section with their flanges pointing inwards so that in each case the lower of said flanges serves as a rail for a number of wheels or rollers 65. These are mounted upon depending supports 66, the lower ends of which are secured to a rectangular frame 67, the latter thus being free to ride along the rails 64. The frame 67 is prevented from becoming jammed, by the provision of guide rollers 68 adapted to run along the edges of the flanges. A pair of relatively long rollers 69 and 70 are mounted rotatably within the frame 67, the roller 70 being arranged to be driven at a predetermined slow speed by an electric motor and gear box unit 71 coupled to the spindle of the roller 70 by means of a belt or chain drive 72.

The map 22 is, in this case, in the form of a wide endless band which extends over the rollers 69 and 70 and therefore has its upper surface visible through the opening 63. In addition to being movable in a longitudinal sense by rotation of the roller 70, the map 22 can be moved simultaneously in a lateral direction by causing the frame 67 to travel along the runners 64, the means for bringing about this lateral movement being shown in Figure 5. A tension member 73 is arranged in the form of a loop with its two ends connected to opposite sides of the frame 67 at 74 and 75 respectively, said tension member being guided by pulleys 76, 77, 78, 79 and 80, while it also passes over a driving pulley, sprocket, drum or the like 81. The latter is driven at a predetermined slow speed by means of an electric motor and gear box unit 82; by varying the speed of this unit in relation to that of the driving unit 71, the map 22 can be caused to move past the opening 63 in any desired oblique direction, within limits, thus simulating the effect of drift experienced when flying in an aircraft. The floor 62 can, if desired, be covered in by walls indicated at 83 and a roof 84.

It is sometimes desirable for the instructor to have an indicating device adapted to show the accuracy of the pupil's "shots," and one such arrangement is shown diagrammatically in Figure 7 as applied to the large training device illustrated in Figures 5 and 6. The frame 67 which is mounted on runners as before, is coupled by a link 85 with the free end of a lever 86 pivotally anchored to a fixed support at 87. A link 88 pivoted to the lever 86 at a suitable position along its length serves to bring about sliding movement of a relatively small frame 89 fitted with rollers 90 and 91 over which passes an auxiliary map or chart 92. This is a replica of the map 22, but is drawn to a much smaller scale, which latter of course determines the point of attachment of the link 88 to the lever 86. For instance, supposing that the map 92 is one-quarter the scale of the map 22, then the frame 89 needs to be moved through one-quarter the distance travelled by the frame 67, and the link 88 would correspondingly be attached to the lever 86 at a position separated from the pivot 87 by one-quarter of the distance between said pivot 87 and the attachment of the link 85 to the lever 86. A corresponding reduction in the "longitudinal" rate of travel of the auxiliary map 92 can be obtained by making the roller 91 of the appropriate diameter and driving it directly from the roller 70, say, by means of a flexible shaft 93. A bridge 94 extending above the auxiliary map 92 is provided with a series of electromagnetic markers 95, which are operated in conjunction with the push buttons 33, shown in Figure 6, so as to provide an indication of the "shots" secured by the respective pupils.

It will of course be appreciated that the "shot" indicating and recording means used with the device shown in Figures 5 and 6 can be varied in numerous ways to give desired effects, such as by the inclusion of time lag switches (not shown) adapted to produce an imitation of the times of flight of the bombs. Moreover, mechanism conveniently of pantograph or like construction can be incorporated so that the instructor, in placing an index against any point on the auxiliary map or chart, moves a pointer, indicating light or other member to a corresponding position on the main map or equivalent. By this means the accuracy of the various "shots" can be readily demonstrated to the pupils.

It will be seen that, as the main map or equivalent is capable of being driven simultaneously in two directions mutually at right angles, the instructor can set the apparatus so as to imitate all possible directions of flight, and this enables the pupils to carry out numerous exercises in navigation as well as in bomb-releasing. The device is also useful for training pupils in the use of trailing drift sights, such pupils making their observation through that part of the opening 63 remote from the bomb sights 28, so that the map 22 gives a realistic impression of the receding ground.

It will be understood that the construction of apparatus described is given merely by way of example and that the principles employed may be utilised in many other ways. For instance, the main map or equivalent (and/or the auxiliary map or chart) may be in the form of a flat sheet which is movable in the manner above mentioned in order to imitate the conditions prevailing during flight; moreover other mechanism may be used for actuating the map or equivalent, and in some cases it may be found desirable to utilise a screw-and-nut arrangement for driving the said map or equivalent in one or in both directions.

What I claim is:

1. A device for instruction in aerial bombing, comprising stationary means defining an observation opening, a map mounted for movement under and in registry with said opening, means for moving said map under said opening at a controlled speed, a bomb sight mounted on said stationary means and directed through said opening onto said map, dummy bomb release means, means for indicating a theoretical bomb landing position on said map and means for actuating said indicating means in timed relation to the operation of said bomb release means.

2. A device as claimed in claim 1 wherein the indicating means is electrically operated and in which the circuit therefor is closed by the actuation of the dummy bomb release means.

3. A device for instruction in aerial bombing, comprising stationary means defining an obesrvation opening, a map mounted for movement under and in registry with said opening, means for simultaneously moving said map longitudinally and laterally under said opening at separately controlled speeds, a bomb sight mounted on said stationary means and directed through said opening onto said map, dummy bomb release means, means for indicating a theoretical bomb landing position on said map and means for actuating said indicating means in timed relation to the operation of said bomb release means.

4. A device for instruction in aerial bombing, comprising stationary means defining an observation opening, a map mounted for movement under and in registry with said opening, means for moving said map under said opening at a controlled speed, a bomb sight mounted on said stationary means, angularly adjustable means for directing said bomb sight through said opening to simulate variations in line of sight brought about by differences in aircraft altitude, dummy bomb release means, means for indicating a theoretical bomb landing position on said map and means for actuating said indicating means in timed relation to the operation of said bomb release means, said last-named means being adjusted by the angular adjustment of the bomb sight.

5. A device as claimed in claim 1 comprising further an angularly movable index to indicate a theoretical longitudinal aircraft axis.

6. A device for instruction in aerial bombing, comprising stationary means defining an observation opening, means supporting a map for longitudinal movement, means for supporting the map supporting means for lateral movement, means for moving the map longitudinally, separate means for moving the map supporting means laterally, at least one bomb sight mounted on said stationary means and directed through said opening onto said map, dummy bomb release means, means for indicating a theoretical bomb landing position on said map, and means for actuating said indicating means in timed relation to the operation of said bomb release means.

7. A device for instruction in aerial bombing comprising stationary means defining an observation opening, means supporting a map for longitudinal movement, means for supporting the map supporting means for lateral movement, means for moving the map longitudinally, separate means for moving the map supporting means laterally, at least one bomb sight mounted on said stationary means and directed through said opening onto said map, dummy bomb release means associated with each bomb sight, means for indicating a theoretical bomb landing position on said map, means for actuating said indicating means in timed relation to the operation of said bomb release means, a second map similar to but smaller than the first, means for moving said second map laterally and longitudinally in response to corresponding movement of the first-named map, the rate of movement of the two maps bearing the same ratio to their respective scales, means for indicating a theoretical bomb landing position on said second map, and means for actuating said last-named means in timed relation to the operation of said bomb release means.

GEORGE HANCOCK REID.